(12) United States Patent
Sano et al.

(10) Patent No.: US 8,185,071 B2
(45) Date of Patent: May 22, 2012

(54) TUNER MODULE

(75) Inventors: Eiichi Sano, Kanagawwa (JP);
Tomonori Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 12/621,883

(22) Filed: Nov. 19, 2009

(65) Prior Publication Data

US 2010/0130148 A1    May 27, 2010

(30) Foreign Application Priority Data

Nov. 27, 2008   (JP) .................................. 2008-303000
Sep. 15, 2009   (JP) .................................. 2009-213485

(51) Int. Cl.
*H04B 1/18* (2006.01)
(52) U.S. Cl. ................................................... 455/182.2
(58) Field of Classification Search ............... 455/182.2, 455/151, 302, 314, 188.1, 189.1
See application file for complete search history.

(56) References Cited

U.S. PATENT DOCUMENTS

| | | | |
|---|---|---|---|
| 4,132,952 A | | 1/1979 | Hongu et al. |
| 6,127,962 A | * | 10/2000 | Martinson ........................ 342/20 |
| 7,423,699 B2 | * | 9/2008 | Vorenkamp et al. .......... 348/726 |

FOREIGN PATENT DOCUMENTS

| | | |
|---|---|---|
| DE | 3200560 A1 | 7/1983 |
| JP | 01-137835 | 5/1989 |
| JP | 03-045021 | 2/1991 |
| JP | 06-077732 | 3/1994 |
| JP | 2003-218716 A | 7/2003 |
| JP | 2008-521359 A | 6/2008 |
| WO | WO 2005/065310 A2 | 7/2005 |

* cited by examiner

*Primary Examiner* — Sanh Phu
(74) *Attorney, Agent, or Firm* — Wolf, Greenfield & Sacks, P.C.

(57) ABSTRACT

A tuner module includes a filter that reduces the signal level outside the frequency band of a selected channel in an input RF signal of terrestrial television broadcasting, a local oscillation circuit that oscillates a local oscillation signal, a mixing circuit that mixes the RF signal in which the signal level outside the frequency band of the selected channel is reduced by the filter and the local oscillation signal oscillated by the local oscillation circuit to downconvert the RF signal to an intermediate frequency signal, and a control circuit that controls the local oscillation frequency of the local oscillation signal oscillated by the local oscillation circuit. The control circuit adjusts the local oscillation frequency to a value that suppresses an effect of a disturbance wave from other channels within a frequency band of the intermediate frequency signal of the selected channel.

10 Claims, 13 Drawing Sheets

TUNER MODULE

BACKGROUND OF THE INVENTION

1. Field of the Invention

The present invention relates to a tuner module that downconverts a received RF (radio frequency) signal into a low frequency intermediate signal.

2. Description of the Related Art

FIG. 1 is a diagram illustrating the structure of a typical tuner module 100 of the related art. The tuner module 100 receives, for example, terrestrial television broadcasting. The tuner module 100 of the related art has a circuit 101 including an air-core coil adjusted manually and an external RF amplifier, and a circuit 102 including an external resonator for a VCO (voltage controlled oscillator). The tuner module 100 of the related art further has a circuit 103 including an external crystal reference signal source and a circuit 104 including a SAW (surface acoustic wave) filter for intermediate frequency (IF) signals (referred to below as intermediate signals). The tuner module 100 of the related art includes about 300 parts and has a large structure, which is, for example, 100 mm wide, 50 mm long, and 14 mm thick.

FIG. 2 is a block diagram illustrating the internal structure of the tuner module 100 of the related art. An RF signal received at an antenna 501A is input to a tuning circuit 502 through an input terminal 501. In response to channel selection by the user, the tuning circuit 502 reduces the signal level outside the frequency band of a desired channel in the RF signal and sets the channel (referred to below as the selected channel) for which the frequency is selected. The RF signal of the selected channel set by the tuning circuit 502 is amplified by a high frequency amplification circuit 503. A mixing circuit 504 mixes the signal supplied by the high frequency amplification circuit 503 and a local oscillation signal oscillated by a local oscillation circuit 505 for frequency conversion and outputs an intermediate signal.

The video intermediate frequency in the tuner module of a typical analog television set of the related art is 58.75 MHz and the image frequency is 117.5 MHz higher than the frequency of a desired signal. Accordingly, the image signal can be attenuated sufficiently by a filter of passive elements included in the tuning circuit 502.

Recently, an ultra-thin television set or the like has come into wide spread use and a tuner module, which is one of the most important components in the television set, is requested to reduce its size and thickness. Many television sets currently incorporate a plurality of tuner modules to support many functions such as recording functions and multi-screen display, and therefore a small-sized tuner module is further requested.

Accordingly, a tuner module that includes a silicon IC (integrated circuit) in which RF circuits are integrated on a semiconductor such as Si or SiGe has been recently adopted in place of the tuner module of the related art, which has many components. The tuner module including a silicon IC in which analog components of the tuner module of the related art are integrated has much less components than the tuner module of the related art, thereby being small-sized. For example, a silicon tuner module 110 in FIG. 3 has a silicon IC in which RF circuits of CMOS (complementary metal oxide semiconductor) transistors are integrated on a semiconductor. Accordingly, the silicon tuner module 110 includes 75 or less components and has a circuit configuration much smaller than the tuner module 100 (see, for example, Japanese Unexamined Patent Application (Translation of PCT Application) No. 2008-521359).

SUMMARY OF THE INVENTION

Many of tuner modules that include a silicon IC have the low-IF architecture, which is suitable for small-sized circuits. In this architecture, an input RF signal is converted into a low frequency intermediate signal (low-IF). In this case, the frequency (image frequency) of an image signal, which is a disturbance wave from channels adjacent to a selected channel, is relatively close to the frequency of the RF signal of the selected channel, which is a desired signal. Accordingly, it is difficult to completely block the signals with the image frequency using the frequency selective characteristic of a filter of passive elements.

A filter that cancels disturbance waves by reversing the amplitude and phase to remove the waves is currently in actual use, but it is difficult to completely block disturbance waves of a large level, possibly generating noise in an image of television broadcasting.

It is desirable to suppress an effect of reception disturbance even in a tuner module that adopts the low-IF architecture.

According to an embodiment of the present invention, there is provided a tuner module including a filter that reduces a signal level outside a frequency band of a selected channel in an input RF signal of terrestrial television broadcasting, a local oscillation circuit that oscillates a local oscillation signal, a mixing circuit that mixes the RF signal in which the signal level outside the frequency band of the selected channel is reduced by the filter and the local oscillation signal oscillated by the local oscillation circuit to downconvert the RF signal to an intermediate frequency signal, and a control circuit that controls a local oscillation frequency of the local oscillation signal oscillated by the local oscillation circuit, in which the control circuit adjusts the local oscillation frequency to a value that suppresses an effect of a disturbance wave from other channels within a frequency band of the intermediate frequency signal of the selected channel.

According to an embodiment of the present invention, a low-IF architecture tuner module for receiving terrestrial television broadcasting can suppress an effect of reception disturbance due to an RF signal from channels adjacent to the selected channel.

DESCRIPTION OF THE PREFERRED EMBODIMENTS

A preferred embodiment (referred to below as the present embodiment) according to the present invention will be described below in the following order with reference to the drawings.
1. Structure of a tuner module according to the present embodiment
2. Control of local oscillation frequency by the tuner module according to the present embodiment
<1. Structure of a Tuner Module According to the Present Embodiment>

Figure 1:
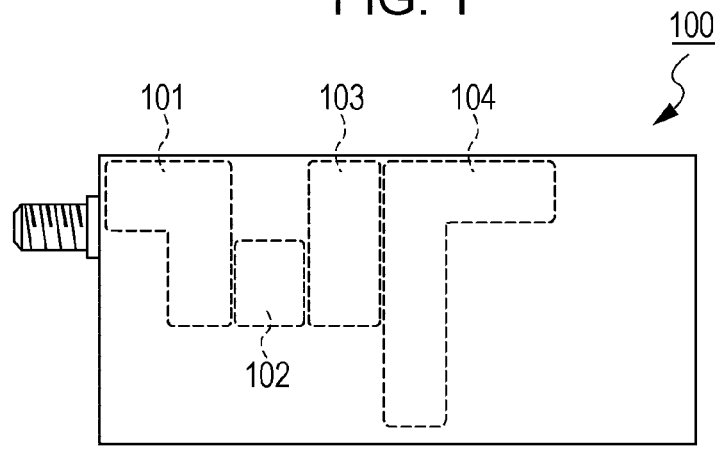
FIG. 1 is a diagram illustrating the structure of a typical tuner module of the related art.
Figure 2:
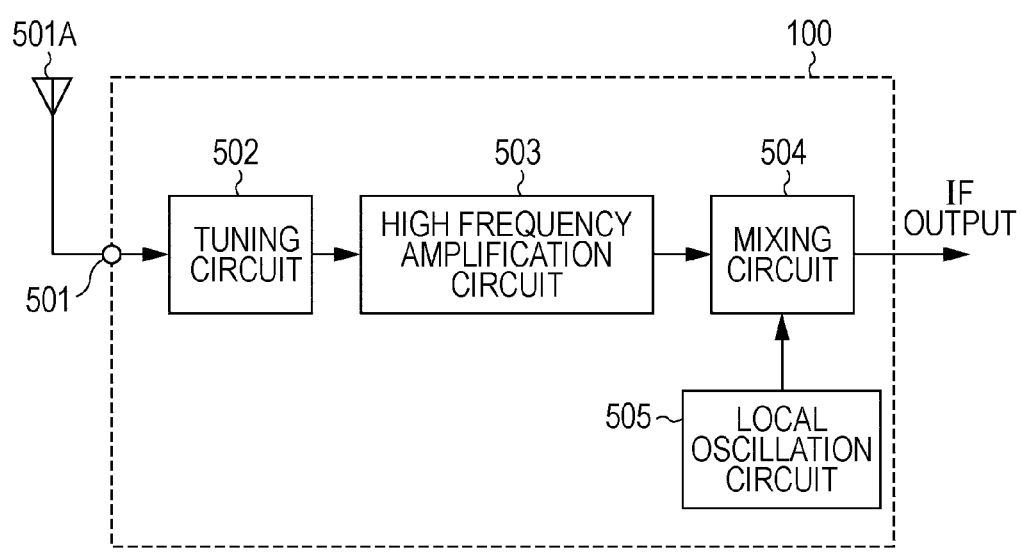
FIG. 2 is a block diagram illustrating the internal structure of the tuner module of the related art.
Figure 3:
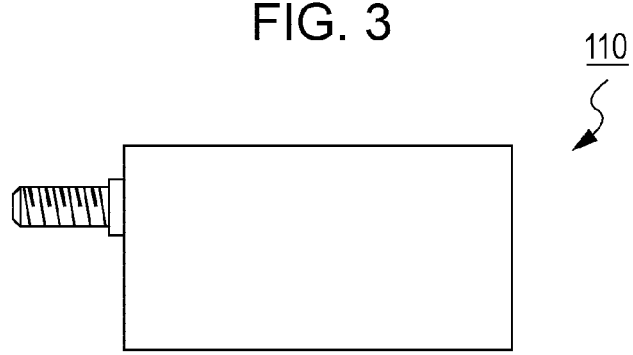
FIG. 3 is a diagram illustrating the structure of a silicon tuner module.
Figure 4:
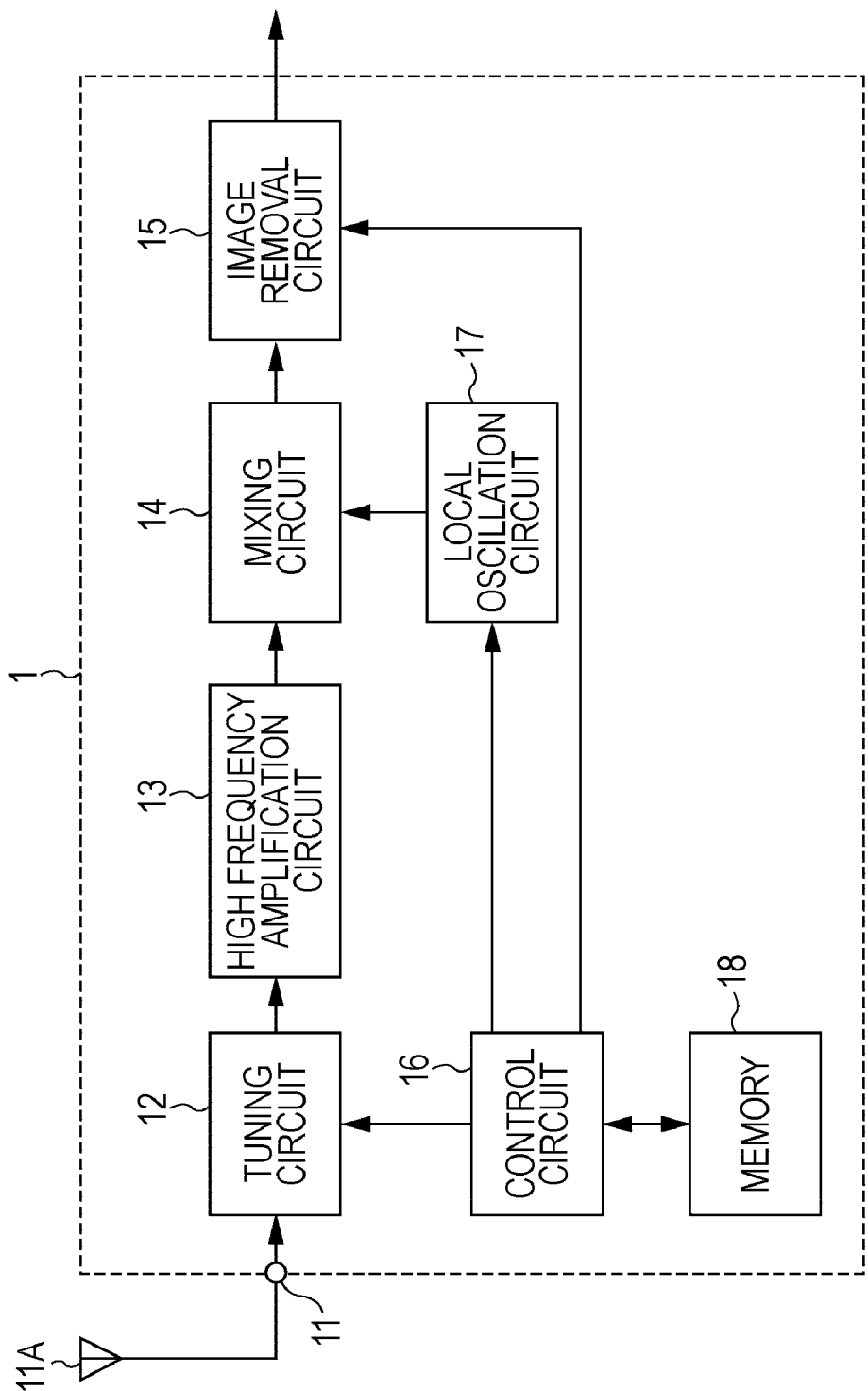
FIG. 4 is a block diagram illustrating the internal structure of a tuner module according to an embodiment of the present invention.

FIG. 4 is a block diagram illustrating the internal structure of a tuner module 1 according to the present embodiment. The tuner module 1 according to the present embodiment includes a silicon tuner IC in which CMOS (complementary metal oxide semiconductor) type RF circuits are integrated on a semiconductor such as Si or SiGe. The tuner module 1 adopts the low-IF architecture, which converts an RF signal input from an antenna into a certain low frequency. This allows the tuner module 1 to have a small circuit structure including much less components than a standard superheterodyne tuner module of the related art.

The tuner module 1, which has an input terminal 11, a tuning circuit 12, a high frequency amplification circuit 13, a mixing circuit 14, an image removal circuit 15, a control circuit 16, a local oscillation circuit 17 oscillating a local oscillation signal, and a memory 18, selects the frequency of a desired channel. The tuner module 1 can receive the broadcast waves of terrestrial analog television broadcasting, terrestrial digital television broadcasting, etc. The broadcast wave of terrestrial analog television broadcasting received by the tuner module 1 from an antenna 11A is supplied to the tuning circuit 12 through the input terminal 11.

The tuning circuit 12 has a bandpass filter. According to control by the control circuit 16, the tuning circuit 12, using this bandpass filter, reduces the signal level outside the frequency band of the channel desired by the user in an RF signal of terrestrial analog television broadcasting supplied from the input terminal 11. The tuning circuit 12 sets a selected channel in this way. Then, the tuning circuit 12 supplies, to the high frequency amplification circuit 13, the RF signal in which the signal level outside the frequency band of a desired channel is reduced. The high frequency amplification circuit 13 amplifies the RF signal supplied from the tuning circuit 12 and supplies it to the mixing circuit 14.

The mixing circuit 14 mixes the RF signal supplied from the high frequency amplification circuit 13 and the local oscillation signal with a local oscillation frequency $f_{LO}$ oscillated by the local oscillation circuit 17 and performs down-conversion into an intermediate signal with an intermediate frequency $f_{IF}$. The mixing circuit 14 supplies the obtained intermediate signal to the image removal circuit 15.

The image removal circuit 15 has an image removal filter that performs a cancellation by reversing the amplitude and phase to reduce or remove signals causing image disturbance to the intermediate signal supplied from the mixing circuit 14.

An intermediate signal is used in the tuner module 1, so an interference wave (image disturbance) by an image frequency may be caused. The image frequency and the center frequency of a desired channel are mutually located symmetrically with respect to the local oscillation frequency $f_{LO}$. The image frequency may adversely affect the tuner module 1 significantly by disturbing the intermediate signal directly.

The control circuit 16 controls the tuning circuit 12 according to channel selection by the user. The control circuit 16 also controls the image removal circuit 15 by supplying, to the image removal circuit 15, a predetermined setting for reducing or removing signals causing image disturbance to the intermediate signal supplied to the image removal circuit 15 from the mixing circuit 14.

The control circuit 16 also controls the local oscillation circuit 17 so as to oscillate the local oscillation frequency $f_{LO}$ for suppressing an effect of reception disturbance causing image disturbance depending on the selected channel. Specifically, the local oscillation frequency $f_{LO}$ for suppressing an effect of reception disturbance is set depending on the selected channel and stored for each channel in a table in the memory 18. The control circuit 16 selects and reads the setting and supplies it to the local oscillation circuit 17. The local oscillation circuit 17 oscillates a local oscillation signal with the local oscillation frequency $f_{LO}$, which is the setting supplied by the control circuit 16, and supplies it to the mixing circuit 14.

For example, the control circuit 16 supplies, to the local oscillation circuit 17, the local oscillation frequency $f_{LO}$ that is higher (upper-local) or lower (lower-local) than the center frequency of the selected channel depending on the selected channel. In the tuner module 1, which adopts the low-IF architecture, the local oscillation frequency $f_{LO}$ is set to a value close to the center frequency of the selected channel.

The memory 18 has the table (not shown) that stores the setting of the local oscillation frequency $f_{LO}$ for each channel, which is supplied by the control circuit 16 to the local oscillation circuit 17 to switch the local oscillation frequency $f_{LO}$. The control circuit 16 sets the local oscillation frequency $f_{LO}$ when, for example, the tuner module 1 is preset. The setting of the local oscillation frequency $f_{LO}$ for each channel is stored in this table.

Figure 5:
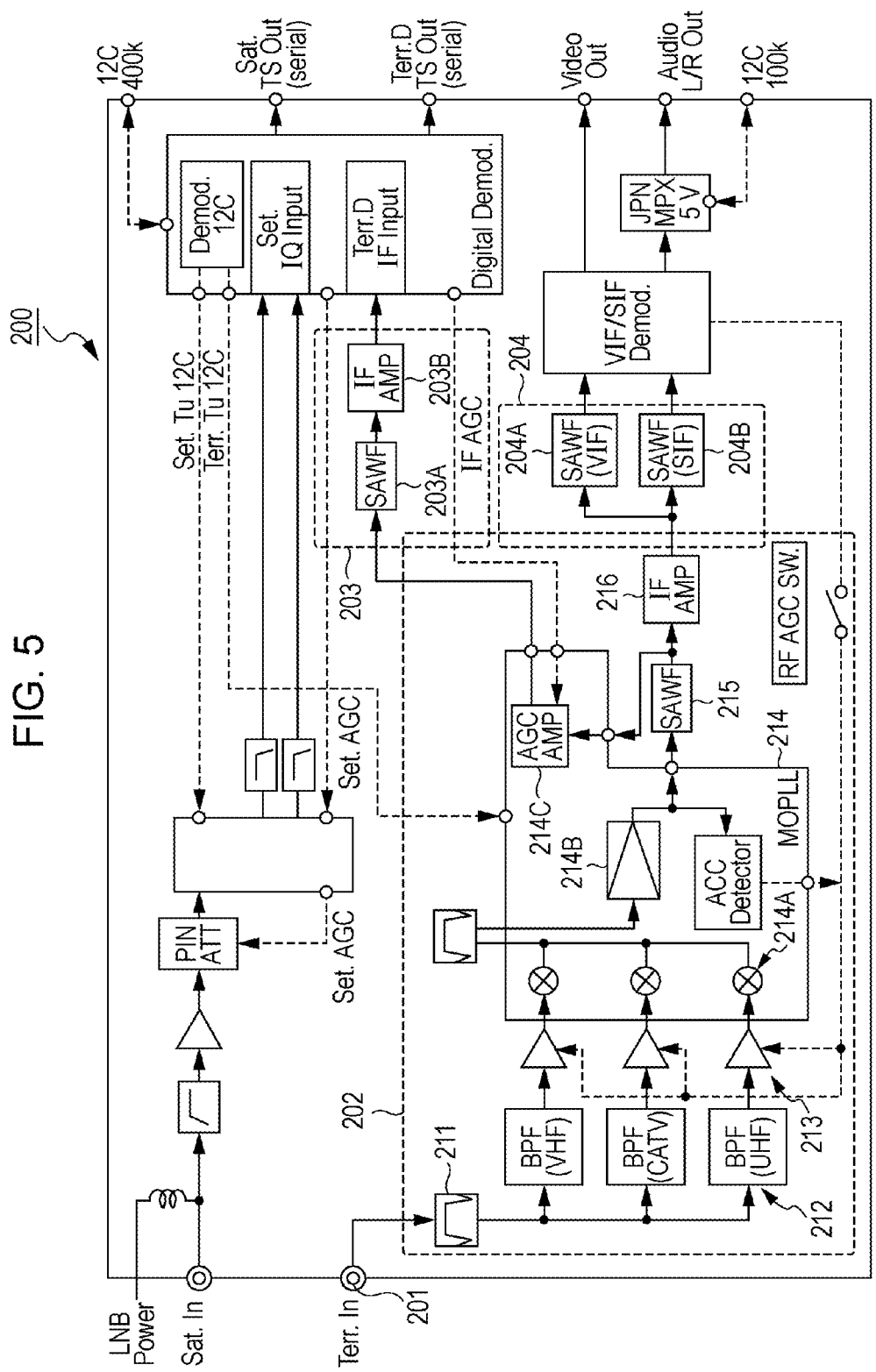
FIG. 5 is a block diagram illustrating a detailed internal structure of a typical tuner module of the related art.

FIG. 5 is a block diagram illustrating the detailed internal structure of a tuner module 200, which is a typical tuner module of the related art. In the tuner module 200, a terrestrial digital/analog broadcast signal is input from an input terminal 201, passes through an IF filter 211, and is supplied to a tuning circuit (BPF) 212. The tuning circuit 212 selects a desired channel frequency from VHF (very high frequency), CATV (community antenna television), and UHF (ultra high frequency). Next, the level of the signal selected as the desired channel frequency is adjusted to a constant value by an AGC amplifier 213, the level of which is controlled by the RF AGC (radio frequency automatic gain control) voltage. This signal, the level of which is adjusted to a constant value, is input to an MOPLL (mixer oscillator/phase locked loop) 214.

In the MOPLL 214, the input signal is downconverted by a mixer 214A into an intermediate signal (IF) with the intermediate frequency (centered on IF 57 MHz), amplified by an IF amplifier 214B, and then output. The output signal passes through a SAW filter 215 that removes the out-of-band unnecessary signal, passes through an IF amplifier 216, and is input to a SAW filter (VIF) 204A and a SAW filter (SIF) 204B of a circuit 204. The signal output from the SAW filter 215 is input to a SAW filter 203A of a circuit 203 through an AGC amplifier 214C, and then supplied to an IF amplifier 203B.

Figure 6:
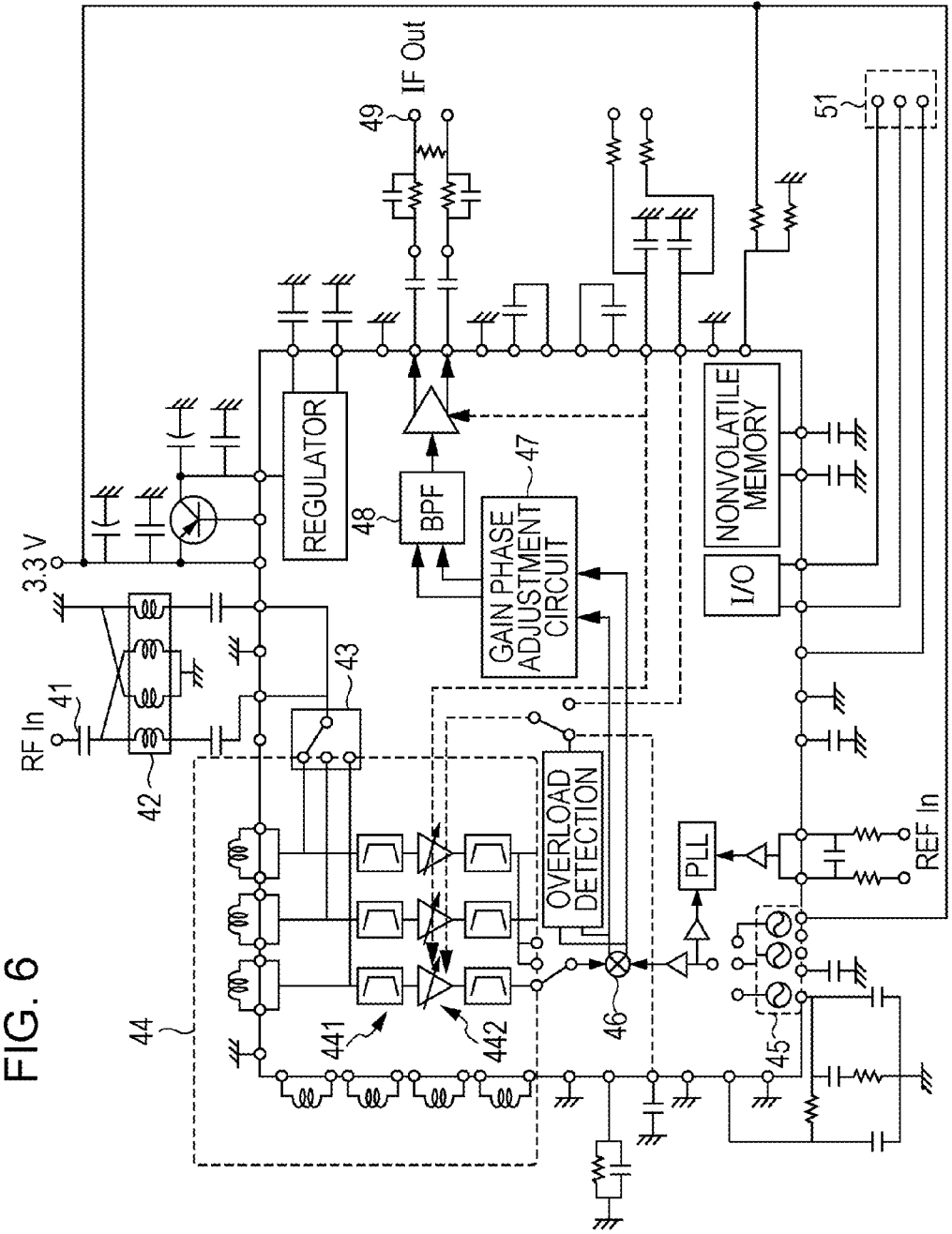
FIG. 6 is a diagram illustrating in detail a part of the circuit structure of the tuner module according to the present embodiment.

In the tuner module 1, the functions of a circuit 202, the circuit 203, and the circuit 204 in the tuner module 200 of the related art are integrated into an IC with the circuit configuration shown in FIG. 6.

In FIG. 6, an RF signal input from an input terminal 41 (equivalent to the input terminal 11 in FIG. 4) is input to an RF tracking adjustment unit 44 through a switch 42 and a switching terminal 43. The RF tracking adjustment unit 44 has six tuning circuits 441 (equivalent to the tuning circuit 12 in FIG. 4) and three high frequency amplification circuits 442 (equivalent to the high frequency amplification circuit 13 in FIG. 4). The six tuning circuits 441 and the three high frequency amplification circuits 442 constitute three sets of circuits, each of which includes two tuning circuits 441 and one high frequency amplification circuit 442. The switching terminal 43 performs switching operation depending on the frequency band of the input RF signal and the RF signal is supplied to one of the three tuning circuits 441.

A VCO (voltage controlled oscillator) 45 (equivalent to the local oscillation circuit 17 in FIG. 4) has three local oscillation circuits. The signal from the RF tracking adjustment unit 44 and the local oscillation signal from one of the three local oscillation circuits in the VCO 45 selected depending on the frequency band of the RF signal are mixed by a mixing circuit 46 (equivalent to the mixing circuit 14 in FIG. 4) and downconverted into an intermediate signal with the intermediate frequency $f_{IF}$.

The intermediate signal output from the mixing circuit 46 is supplied to a gain phase adjustment circuit 47 (equivalent to the image removal circuit 15 in FIG. 4). The gain phase adjustment circuit 47 adjusts the gain and phase of the signal output from the mixing circuit 46 and reduces or removes signals causing image disturbance.

The signal output from the gain phase adjustment circuit 47 passes through a bandpass filter (BPF) 48 etc. and is output from an output terminal 49.

An IC (not shown) including a CPU (central processing unit), a ROM (read only memory), a RAM (random access memory), etc. is connected to a terminal set 51. The control circuit 16 in FIG. 4 includes the CPU, the ROM, and the RAM; the memory 18 in FIG. 4 is a part of the RAM.

As described above, the tuner module 1 adopts the low-IF architecture. If the tuner module 1 sets the intermediate frequency to 4 MHz and the local oscillation frequency $f_{LO}$ to a value 4 MHz higher than the center frequency of a selected channel, then the frequency band centered on a frequency 8 MHz higher than the center frequency of a selected channel may cause image disturbance.

For example, if the selected channel is channel 1 in the VHF band (center frequency: 93 MHz), the local oscillation frequency $f_{LO}$ is 97 MHz. The 6 MHz-wide frequency band centered on 101 MHz may become a disturbance wave causing image disturbance. In this case, the intermediate frequency of the video signal of the selected channel obtained through downconversion by the mixing circuit 14 is 5.57 MHz.

The signals that may cause image disturbance are the audio signal (center frequency: 4.75 MHz) in the channel one channel higher than the selected channel and the video signal (carrier wave frequency: 6.25 MHz) in the channel two channels higher than the selected channel. However, in general, the level of an audio signal is lower than that of a video signal. In addition, amplitude modulation is used for an audio signal, so the video signal of the selected channel, which is a desired signal, is not so disturbed. Signals outside the frequency band of the video signal of the selected channel, which is a desired signal, are less disturbed in a detecting phase because band limitation is made by the tuning circuit 12. Accordingly, a disturbance wave causing image disturbance can be suppressed sufficiently by the image removal circuit 15. An example of receiving broadcast waves of Japanese television broadcasting using the tuner module 1 in Japan will be described in detail below. The tuner module 1 is applicable to reception of broadcast waves of television broadcasting receivable in areas in the world (including countries in the world) where a television receiver with a different system structure is used or the spacing between reception channel frequencies is different.

The current terrestrial analog television broadcasting in Japan includes three bands: the VHF low band (channels 1 to 3), VHF high band (channels 4 to 12), and UHF band (channels 13 to 62). Use of adjacent channels may cause a crosstalk, so alternate channels are used in areas other than those between the bands. In the VHF low band (channels 1 to 3), if channel 2 is used, adjacent channels 1 and 3 are difficult to use. Therefore, channels 1 and 3 are used.

Figure 7A:
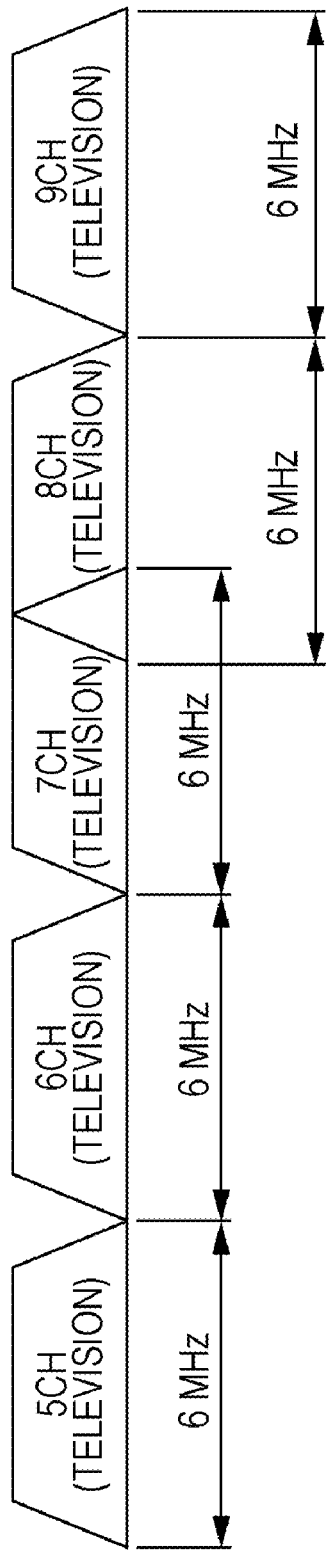
FIG. 7A is a diagram illustrating the assignment of frequencies to a part of channels of terrestrial analog television broadcasting.

FIG. 7A is a diagram illustrating the assignment of frequencies to a part of channels in the VHF band of terrestrial analog television broadcasting. Each channel has a bandwidth of 6 MHz. The spacing between channels is basically 6 MHz to prevent the frequency bands of the channels from overlapping. Channels 7 and 8 have an exclusive bandwidth of 4 MHz because these channels mutually overlap by 2 MHz, but this does not cause a crosstalk because these channels are not assigned concurrently to the same area.

Figure 7B:
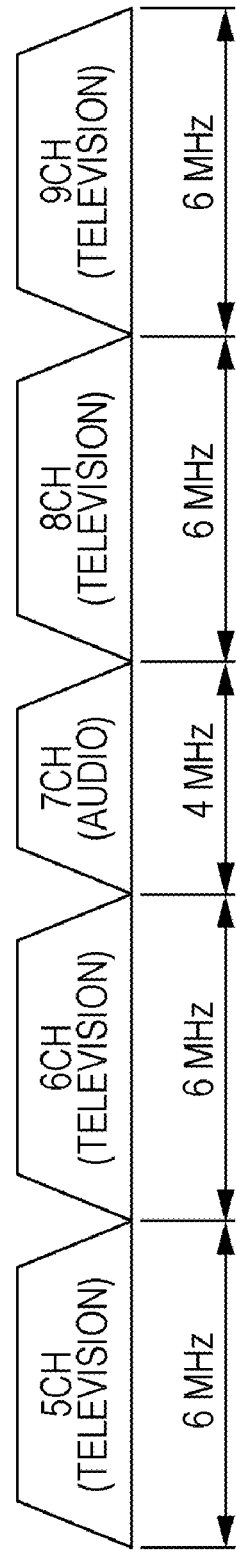
FIG. 7B is a diagram illustrating the assignment of frequencies to channels when both terrestrial analog television broadcasting and terrestrial digital audio broadcasting are present together.

FIG. 7B is a diagram illustrating the assignment of frequencies to channels when both terrestrial analog television broadcasting and terrestrial digital audio broadcasting are present concurrently in this VHF band. The bandwidth between channel 6 and channel 8 is 4 MHz, but the transmission bandwidth of terrestrial digital audio broadcasting is 429 kHz for the 1-segment type or 1289 kHz for the 3-segment type. Accordingly, it is possible to perform the broadcasting in the frequency band of channel 7 without causing a crosstalk to terrestrial analog television broadcasting in channels 6 and 8.

In the VHF band of the current terrestrial analog television broadcasting in Japan, the spacing between channels 6 and 8 and the spacing between channels 7 and 9 are both 4 MHz. The spacing is 2 MHz smaller than that of the other two channels. Accordingly, when channel 6 or 7 is received, image disturbance due to an RF signal from adjacent channels may be caused.

The tuner module 1 can also receive, for example, the broadcast signal of cable television (CATV) broadcasting in addition to terrestrial analog television broadcasting. For example, in the super high band of CATV broadcasting, the spacing between channels C26 and C28 and the spacing between channels C27 and C29 are both 10 MHz. The spacing is 2 MHz smaller than that between other channels.

Accordingly, when the tuner module 1 selects channel C26 or C27 in the super high band of CATV broadcasting, it may suffer image disturbance due to an RF signal from adjacent channels.

For example, the tuner module 1 sets the intermediate frequency to 4 MHz and the local oscillation frequency $f_{LO}$ to a value higher than the center frequency of the selected channel. In this case, the local oscillation frequency $f_{LO}$ is set to a value 4 MHz higher than the center frequency of the selected channel. The mixing circuit 14 mixes the RF signal of the selected channel with the local oscillation signal with the local oscillation frequency $f_{LO}$ oscillated by the local oscillation circuit 17 to downconvert it. As a result, an intermediate signal with a center frequency of 4 MHz and a bandwidth of 6 MHz is obtained. If an RF signal is present in a channel one or two channels above the selected channel, this signal is also downconverted by the mixing circuit 14 and the obtained intermediate signal may become a disturbance wave for the selected channel.

For example, the tuner module 1 sets the intermediate frequency to 3.7 MHz and the local oscillation frequency $f_{LO}$ to a value lower than the center frequency of the reception channel. In this case, the local oscillation frequency $f_{LO}$ is set to a value 3.7 MHz lower than the center frequency of the reception channel. The mixing circuit 14 mixes the RF signal of the selected channel with the local oscillation signal with the local oscillation frequency $f_{LO}$ oscillated by the local oscillation circuit 17 to downconvert it. As a result, an intermediate signal with a center frequency of 3.7 MHz and a bandwidth of 6 MHz is obtained. If an RF signal is present in a channel one or two channels below the RF signal of the selected channel, this signal is also downconverted by the mixing circuit 14 and the obtained intermediate signal may become a disturbance wave for the selected channel.

The tuning circuit 12 uses a bandpass filter to pass only the carrier wave of the selected channel. However, the spacing between channels 6 and 8 (or the spacing between channels 7 and 9) in the VHF band of terrestrial analog television broadcasting or the spacing between channels C26 and C28 (or the spacing between channels C27 and C29) in the super high band of CATV broadcasting are 2 MHz smaller than the those between other channels. Accordingly, the signal component of an RF signal from adjacent channels (channels one or two channels above or below), which may cause image disturbance, may not be removed completely.

Therefore, the control circuit 16 supplies, to the local oscillation circuit 17, the local oscillation frequency $f_{LO}$ that becomes higher or lower than the frequency of the received RF signal depending on the selected channel. The control circuit 16 controls the local oscillation frequency $f_{LO}$ oscillated by the local oscillation circuit 17, in this way.

<2. Control of the Local Oscillation Frequency by the Tuner Module According to the Present Embodiment>

Figure 8:
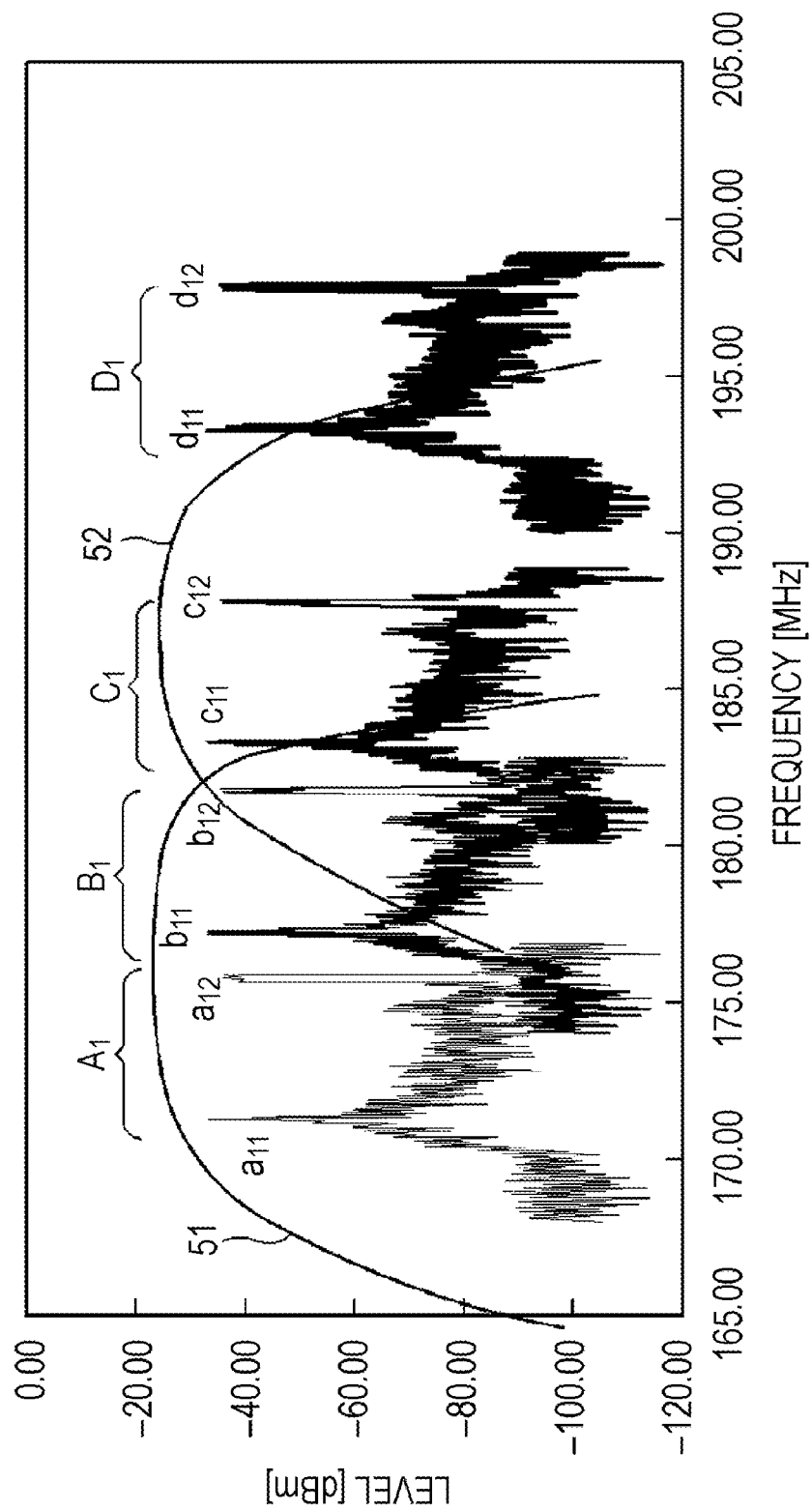
FIG. 8 illustrates the frequency spectrum of the RF signals of channels 4 to 6 and channel 8 in the VHF band of terrestrial analog television broadcasting.

FIG. 8 illustrates the frequency spectrum of the RF signals of channels 4 to 6 and channel 8 in the VHF band of terrestrial analog television broadcasting. In FIG. 8, $A_1$ indicates the spectrum of the RF signal of channel 4, $a_{11}$ indicates the video carrier wave of channel 4, and $a_{12}$ indicates the audio carrier wave of channel 4. $B_1$ indicates the spectrum of the RF signal of channel 5, $b_{11}$ indicates the video carrier wave of channel 5, and $b_{12}$ indicates the audio carrier wave of channel 5. $C_1$ indicates the spectrum of the RF signal of channel 6, $c_{11}$ indicates the video carrier wave of channel 6, and $c_{12}$ indicates the audio carrier wave of channel 6. $D_1$ indicates the spectrum of the RF signal of channel 8, $d_{11}$ indicates the video carrier wave of channel 8, and $d_{12}$ indicates the audio carrier wave of channel 8.

The tuning circuit 12 has a filter that reduces the signal level outside the frequency band of a desired channel. In FIG. 8, a curve 51 indicates the signal level reduced by the channel 4-specific filter included in the tuning circuit 12. A curve 52 indicates the signal level reduced by the channel 6-specific filter included in the tuning circuit 12.

Figure 9:
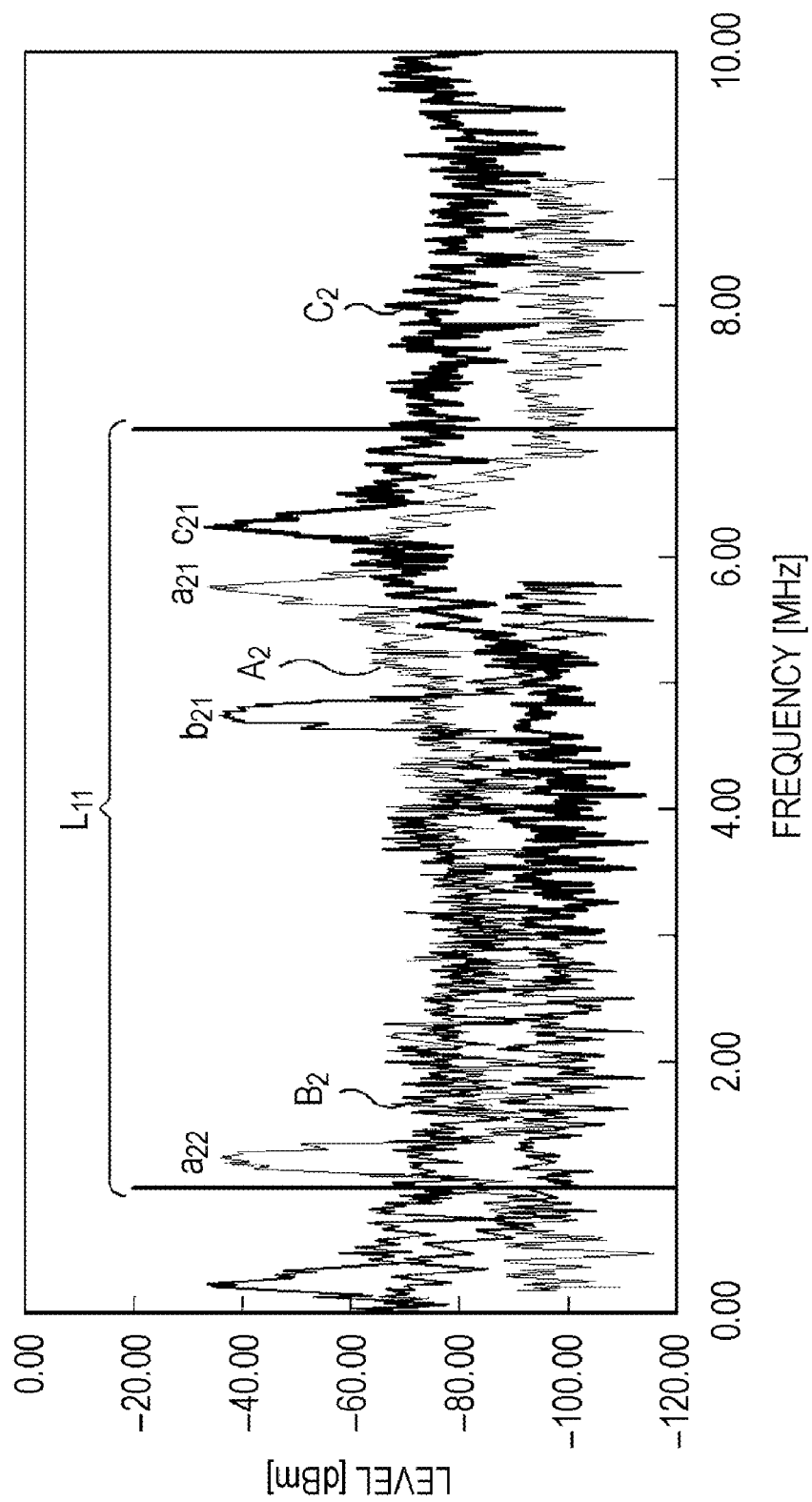
FIG. 9 illustrates the frequency spectrum of the intermediate signal when a local oscillation frequency $f_{LO}$ is set to upper-local, an intermediate frequency $f_{IF}$ is set to 4 MHz, and channel 4 in the VHF band of terrestrial analog television broadcasting is selected.

FIG. 9 illustrates the frequency spectrum of the intermediate signal when the local oscillation frequency $f_{LO}$ is set to upper-local, the intermediate frequency $f_{IF}$ is set to 4 MHz, and channel 4 in the VHF band of terrestrial analog television broadcasting is selected. In this case, the local oscillation frequency $f_{LO}$ is set to 177 MHz. The results shown in FIG. 9 are obtained when the channel 4-specific filter included in the tuning circuit 12 is not used.

FIG. 9 shows the frequency spectrum of the intermediate signal when the frequency of the RF signal is downconverted using the local oscillation signal with a local oscillation frequency $f_{LO}$ of 177 MHz. $L_{11}$ indicates the bandwidth (6 MHz) of the intermediate signal of channel 4. An audio carrier wave $b_{21}$ in an intermediate signal spectrum $B_2$ of channel 5 and a video carrier wave $c_{21}$ in an intermediate signal spectrum $C_2$ of channel 6 may become disturbance waves for a video carrier wave $a_{21}$ in an intermediate signal spectrum $A_2$ of channel 4, which is the desired signal. Since alternate channels are used in area other than those between the three bands in the VHF band of the current terrestrial analog television broadcasting in Japan, reception disturbance is not caused by the RF signal of channel 5. When a broadcast signal of the CATV broadcasting etc. is received in the frequency band of channel 5, however, disturbance waves as shown in FIG. 9 may be generated.

In the frequency spectrum diagram of an intermediate signal, if the video carrier wave or the audio carrier wave of another channel is present between the video carrier wave and the audio carrier wave of the selected channel and is closer to the video carrier wave of the selected channel, the wave is likely to become a disturbance wave. In the frequency spectrum diagram in FIG. 9, the audio carrier wave $b_{21}$ of channel 5 is present between the video carrier wave $a_{21}$ of channel 4 and an audio carrier wave $a_{22}$ of channel 4 and is closer to the video carrier wave $a_{21}$ of channel 4, so the audio carrier wave $b_{21}$ is likely to become a disturbance wave.

The spacing between channels 4 and 6 is 6 MHz. As shown in FIG. 8, the tuner module 1 can reduce the level of the RF signal of channel 6 using the channel 4-specific filter included in the tuning circuit 12, under this set condition.

However, the tuner module 1 may not reduce the level of the RF signal of channel 5 adjacent to channel 4 using the channel 4-specific filter. Accordingly, the RF signal of channel 5 may become a disturbance wave for the intermediate signal spectrum $A_2$ of channel 4, which is the desired signal.

Figure 10:
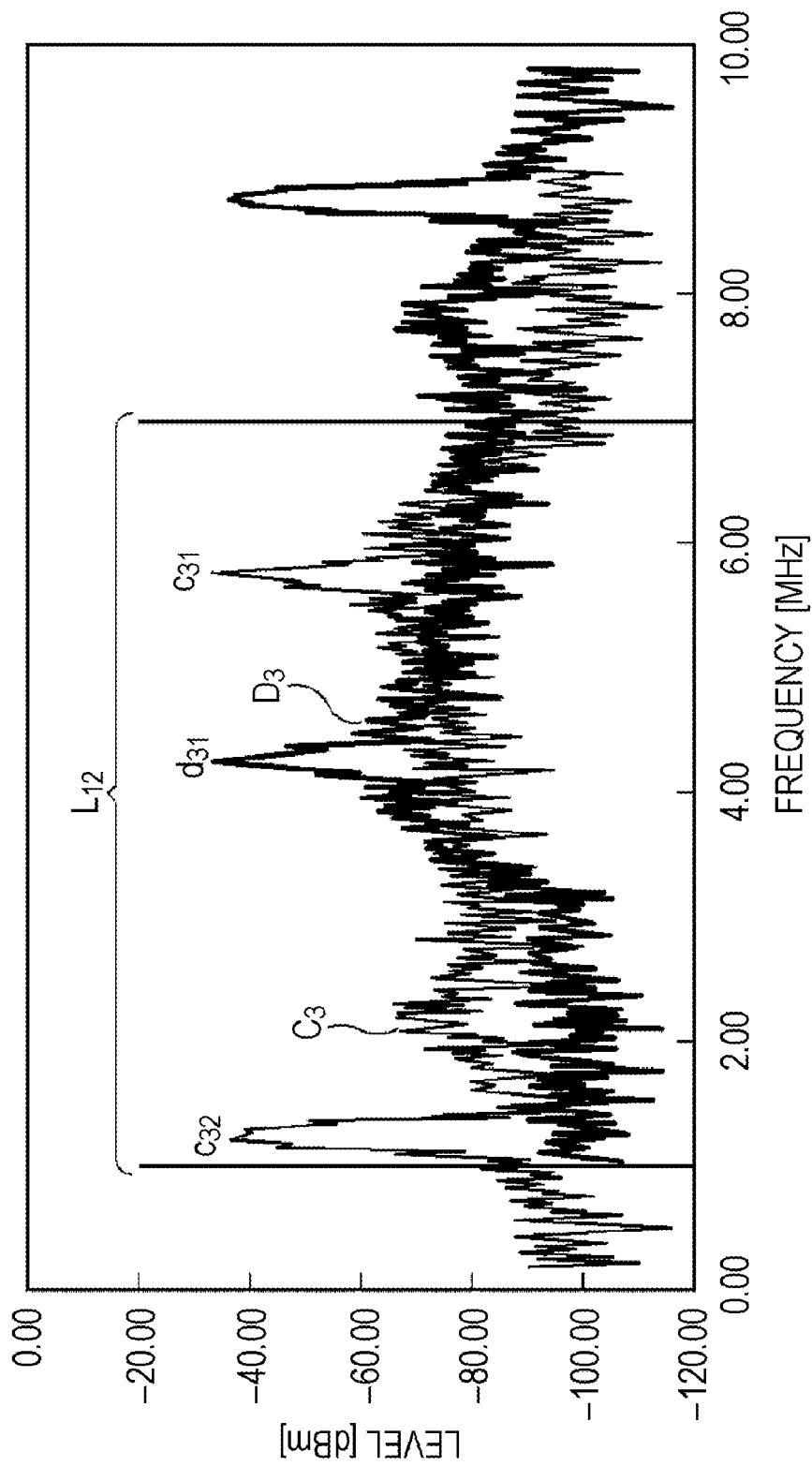
FIG. 10 illustrates the frequency spectrum of the intermediate signal when the local oscillation frequency $f_{LO}$ is set to upper-local, the intermediate frequency $f_{IF}$ is set to 4 MHz, and channel 6 in the VHF band of terrestrial analog television broadcasting is selected.

FIG. 10 illustrates the frequency spectrum of the intermediate signal when the local oscillation frequency $f_{LO}$ is set to upper-local, the intermediate frequency $f_{IF}$ is set to 4 MHz, and channel 6 in the VHF band of terrestrial analog television broadcasting is selected. When channel 6 is selected for upper-local, the local oscillation frequency $f_{LO}$ becomes 189

MHz if the intermediate signal is 4 MHz. The results shown in FIG. 10 are obtained when the channel 6-specific reception filter included in the tuning circuit 12 is not used.

FIG. 10 shows the frequency spectrum of the intermediate signal when the frequency of the RF signal is downconverted using the local oscillation signal with a local oscillation frequency $f_{LO}$ of 189 MHz. $L_{12}$ indicates the bandwidth (6 MHz) of the intermediate signal of channel 6.

A video carrier wave $d_{31}$ of channel 8 is present between a video carrier wave $c_{31}$ of channel 6 and an audio carrier wave $c_{32}$ of channel 6. The spacing between the video carrier wave $c_{31}$ in an intermediate signal spectrum $C_3$ of channel 6 and the video carrier wave $d_{31}$ in an intermediate signal spectrum $D_3$ of channel 8 is only 1.5 MHz. Accordingly, the video carrier wave $d_{31}$ of channel 8 may become a disturbance wave for the intermediate signal spectrum $C_3$ of channel 6, which is the desired signal.

The spacing between channels 6 and 8 is 4 MHz. Under this set condition, the RF signal of channel 8 is reduced slightly as shown in FIG. 8, depending on the channel 6-specific reception filter included in the tuning circuit 12. In addition, the performance of the image removal filter included in the image removal circuit 15 is too poor to completely remove a disturbance wave caused by the RF signal of channel 8.

If the IF frequency is set to a value greater than 4 MHz, the intermediate frequency of channel 8 becomes a smaller value that is away from the intermediate frequency of channel 6. This measure is considered to be effective in preventing image disturbance, but is not effective for the tuner module 1 adopting the low-IF architecture.

Figure 11:
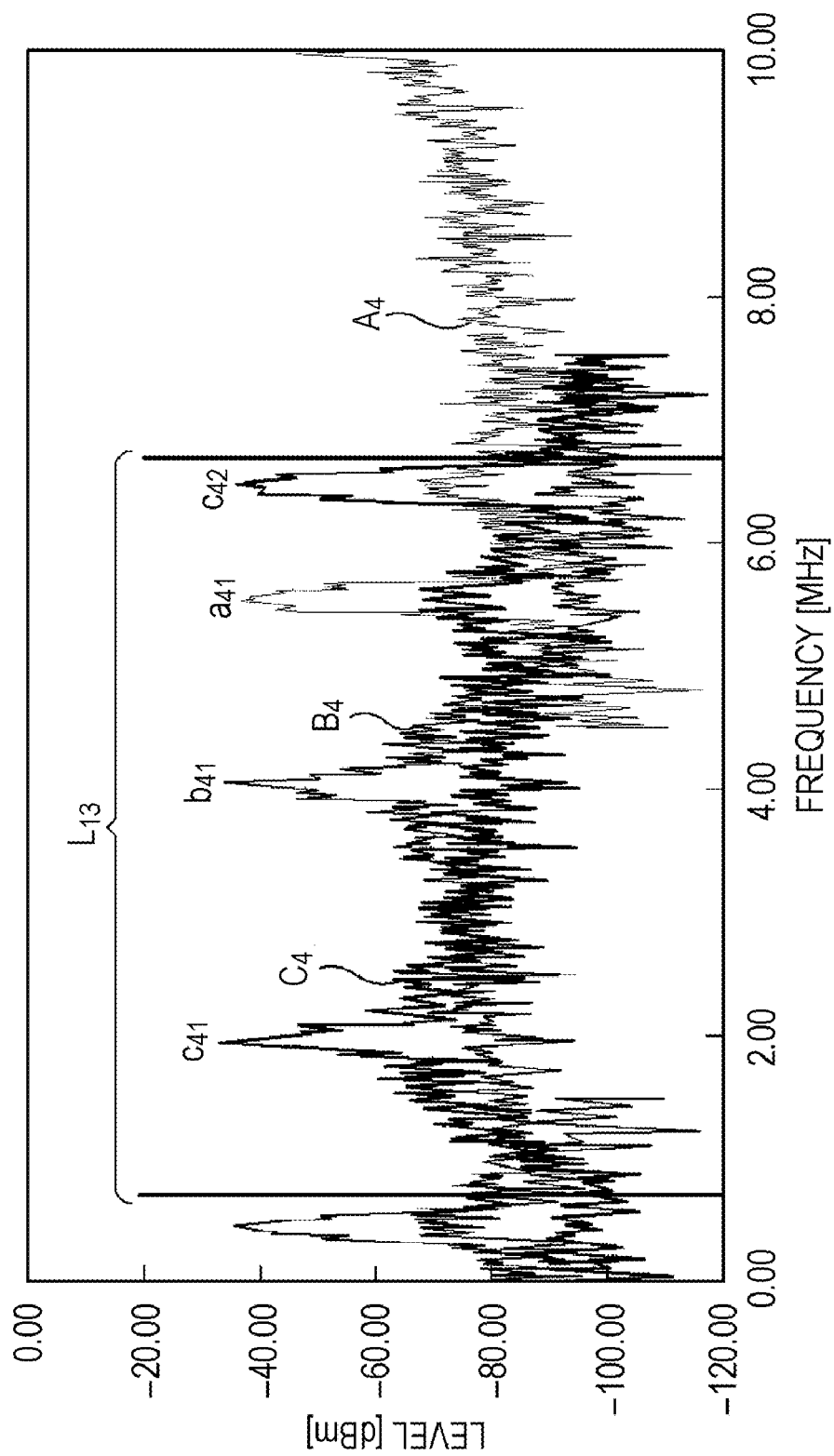
FIG. 11 illustrates the frequency spectrum of the intermediate signal when the local oscillation frequency $f_{LO}$ is set to lower-local, the intermediate frequency $f_{IF}$ is set to 3.7 MHz, and channel 6 in the VHF band of terrestrial analog television broadcasting is selected.

FIG. 11 illustrates the frequency spectrum of the intermediate signal when the local oscillation frequency $f_{LO}$ is set to lower-local, the intermediate frequency $f_{IF}$ is set to 3.7 MHz, and channel 6 in the VHF band of terrestrial analog television broadcasting is selected. When channel 6 is selected for lower-local, the local oscillation frequency $f_{LO}$ becomes 181.3 MHz if the intermediate signal is 3.7 MHz. The results shown in FIG. 11 are obtained when the channel 6-specific reception filter included in the tuning circuit 12 is not used.

FIG. 11 shows the frequency spectrum of the intermediate signal when the frequency of the RF signal is downconverted using the local oscillation signal with a local oscillation frequency $f_{LO}$ of 181.3 MHz. $L_{13}$ indicates the bandwidth (6 MHz) of the intermediate signal of channel 6.

If the local oscillation frequency $f_{LO}$ is set to a value 3.7 MHz lower than the center frequency of the reception channel, the frequency band of the RF signal, which is a disturbance wave, becomes the frequency band centered on a value 7.4 MHz lower than the frequency of a desired signal. If channel 6 in the VHF band is received under this set condition, the RF signal of channel 7, which is one channel above, or channel 8, which is two channels above, does not make disturbance.

An audio carrier wave $a_{41}$ in an intermediate signal spectrum $A_4$ of channel 4 and a video carrier wave $b_{41}$ in an intermediate signal spectrum $B_4$ of channel 5 are present between a video carrier wave $c_{41}$ in an intermediate signal spectrum $C_4$ of channel 6, which is the desired signal, and an audio carrier wave $c_{42}$ of channel 6. Accordingly, the carrier waves $a_{41}$ and $b_{41}$ may become disturbance waves for the intermediate signal spectrum $C_4$ of channel 6, which is the desired signal, but the video carrier wave $b_{41}$ of channel 5 is at least 2.1 MHz away from the video carrier wave $c_{41}$ of channel 6.

Figure 12:
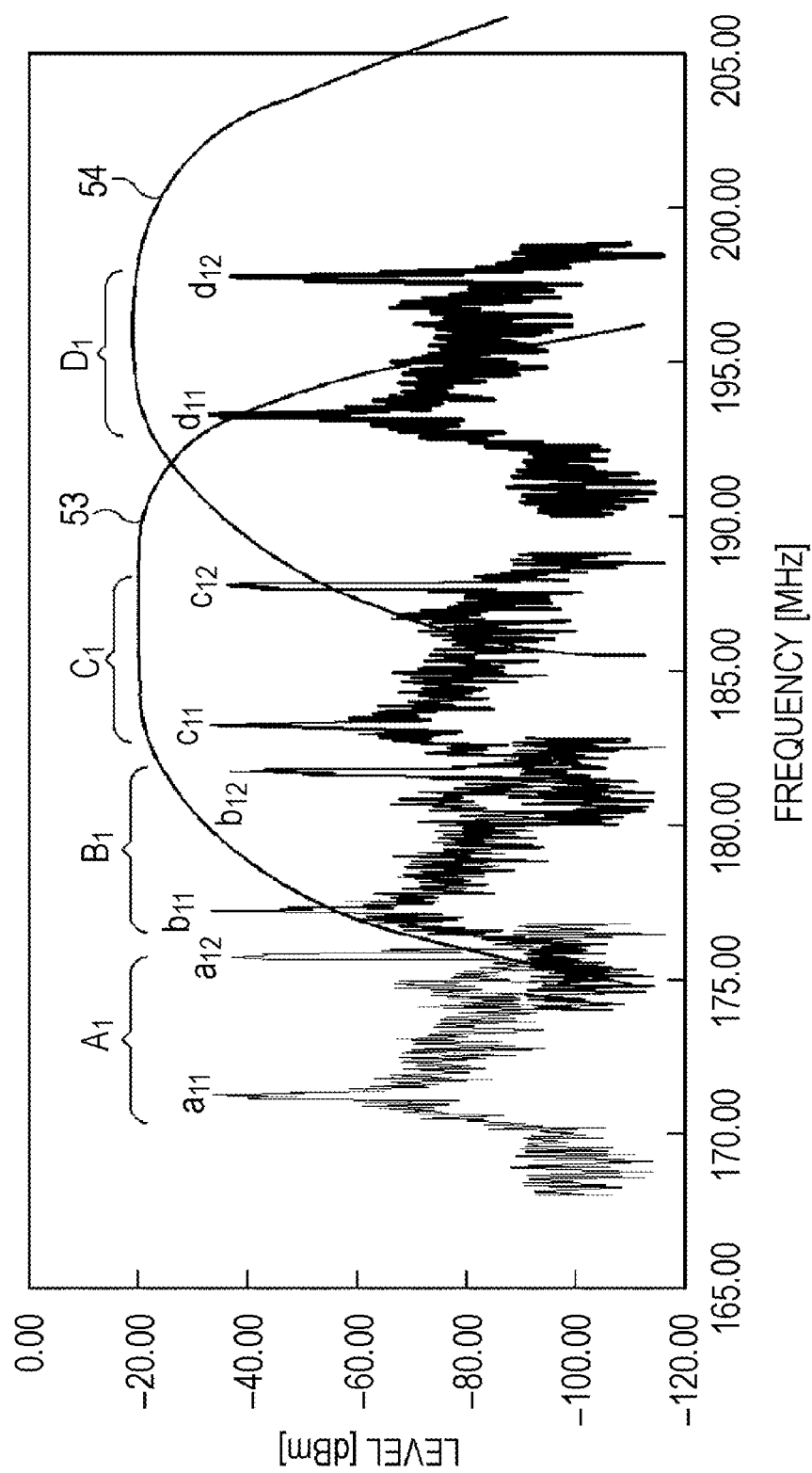
FIG. 12 illustrates the frequency spectrum of the RF signals of channels 4 to 6 and channel 8 in the VHF band of terrestrial analog television broadcasting.

FIG. 12 illustrates the frequency spectrum of the RF signals of channels 4 to 6 and channel 8 in the VHF band of terrestrial analog television broadcasting, as in FIG. 8. In FIG. 12, the same elements as in FIG. 8 are marked with the same symbols and are not described here. In FIG. 12, a curve 53 indicates the signal level reduced by channel 6-specific filter included in the tuning circuit 12. A curve 54 indicates the signal level reduced by channel 8-specific filter included in the tuning circuit 12. The signals $a_{12}$ and $b_{11}$ are away enough from the video carrier wave $c_{11}$ of channel 6, so the signals are sufficiently reduced by the channel 6-specific filter included in the tuning circuit 12.

Even when the upper-local is set, a disturbance wave causing image disturbance can be reduced if the local oscillation frequency $f_{LO}$ is set to an appropriate value.

Figure 13:
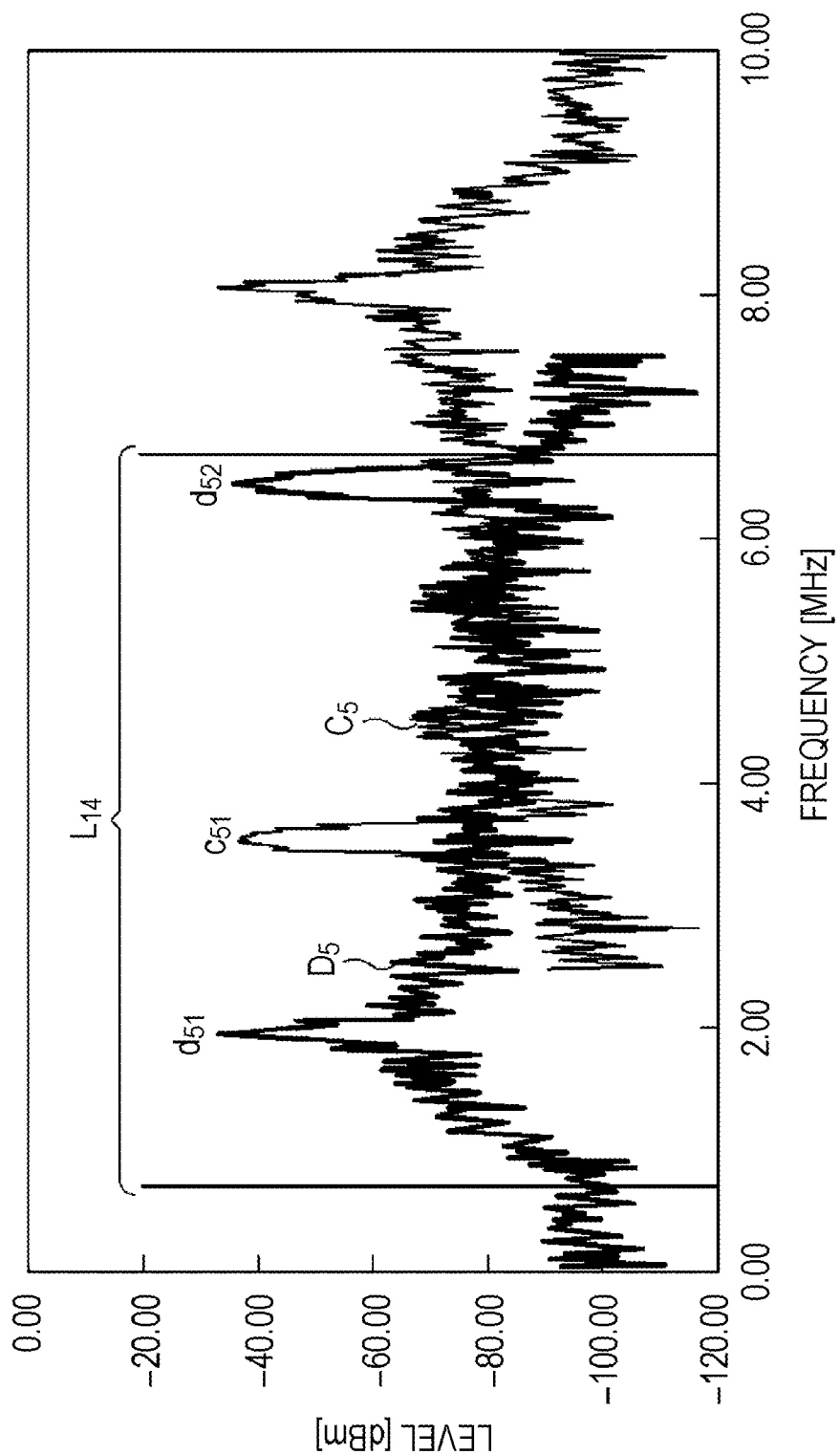
FIG. 13 illustrates the frequency spectrum of the intermediate signal when the local oscillation frequency $f_{LO}$ is set to lower-local, the intermediate frequency $f_{IF}$ is set to 3.7 MHz, and channel 8 in the VHF band of terrestrial analog television broadcasting is selected.

FIG. 13 illustrates the frequency spectrum of the intermediate signal when the local oscillation frequency $f_{LO}$ is set to lower-local, the intermediate frequency $f_{IF}$ is set to 3.7 MHz, and channel 8 in the VHF band of terrestrial analog television broadcasting is selected. When channel 8 is selected for lower-local, the local oscillation frequency $f_{LO}$ becomes 191.3 MHz if the intermediate signal is 3.7 MHz. The results shown in FIG. 13 are obtained when the channel 8-specific filter included in the tuning circuit 12 is not used.

FIG. 13 shows the frequency spectrum of the intermediate signal when the frequency of the RF signal is downconverted using the local oscillation signal with a local oscillation frequency $f_{LO}$ of 191.3 MHz. $L_{14}$ indicates the bandwidth (6 MHz) of the intermediate signal of channel 8.

An audio carrier wave $c_{51}$ of channel 6 is present between a video carrier wave $d_{51}$ and an audio carrier wave $d_{52}$ of channel 8 and the spacing between the audio carrier wave $c_{51}$ of channel 6 and the video carrier wave $d_{51}$ of channel 8 is only 1.6 MHz. That is, the audio carrier wave $c_{51}$ of channel 6 may become a disturbance wave for an intermediate signal spectrum $D_5$ of channel 8, which is the desired signal. However, in general, the level of an audio carrier wave is lower than that of a video carrier wave, so the level of a disturbance wave is low.

When there is no RF signal in channel 9, which is one channel above channel 8, setting the local oscillation frequency $f_{LO}$ to upper-local instead of lower-local further suppresses an effect of reception disturbance.

Based on the examples descried with respect to FIGS. 8 to 13, the tuner module 1 selects the optimum local oscillation frequency $f_{LO}$ for each selected channel in order to demodulate video without suffering image disturbance. In the tuner module 1, the control circuit 16 stores the setting of the optimum local oscillation frequency $f_{LO}$ for each selected channel in the table in the memory 18. The local oscillation frequency $f_{LO}$ can be set by the control circuit 16 when, for example, the tuner module 1 is preset.

For example, the tuner module 1 receives the RF signals of all receivable channels when a television set is installed. The user can previously measure the frequencies and signal levels of the received RF signals. The user grasps the frequency spectrum of RF signals including levels of received RF signals and calculates, for each selected channel, the local oscillation frequency $f_{LO}$ that does not suffer disturbance. The control circuit 16 stores the settings of the calculated local oscillation frequencies $f_{LO}$ in the table in the memory 18. When the tuner module 1 selects a frequency, the control circuit 16 can select an appropriate setting from data stored in the table in the memory 18.

For example, the control circuit 16 stores combinations of a selected channel and the optimum local oscillation frequency $f_{LO}$ in the table in the memory 18. The control circuit 16 can read, from the memory 18, the setting of the optimum local oscillation frequency $f_{LO}$ for each selected channel set during presetting and adjust the setting arbitrary.

Figure 14:
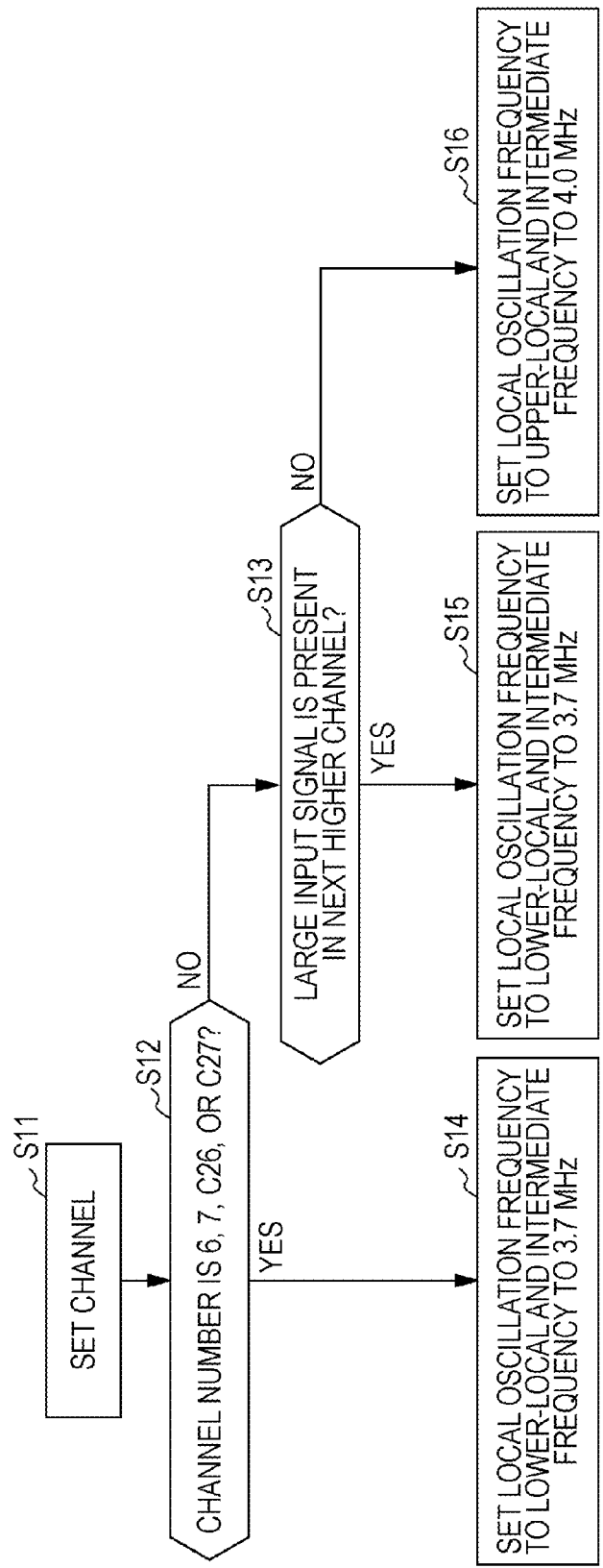
FIG. 14 is a flowchart illustrating an example of setting the local oscillation frequency $f_{LO}$ by the tuner module according to the present embodiment.

An example of controlling the local oscillation frequency $f_{LO}$ by the tuner module 1 will be described below with reference to the flowchart in FIG. 14. In this example, the initial setting of the local oscillation frequency $f_{LO}$ is assumed to be upper-local.

In step S11, the tuning circuit 12 included in the tuner module 1 selects a frequency from RF signals of television broadcasting and sets a desired channel as a selected channel.

In step S12, the control circuit 16 determines whether the selected channel is one of channels 6 and 7 in the VHF band of terrestrial analog television broadcasting and C26 and C27 in the CATV super high band. In step S12, if the selected channel is one of channels 6 and 7 in the VHF band of terrestrial analog television broadcasting and C26 and C27 in the CATV super high band, the processing proceeds to step S14. If the selected channel is none of these channels, the processing proceeds to step S13.

In step S13, the control circuit 16 determines whether there is a large level RF signal in the channel next higher than the selected channel. In step S13, if the control circuit 16 determined that there is a large level RF signal in the channel next higher than the selected channel, the processing proceeds to step S15. In step S13, if the control circuit 16 determined that there is no large level RF signal in the channel next higher than the selected channel, the processing proceeds to step S16.

In step S14, the control circuit 16 sets the local oscillation frequency $f_{LO}$ to lower-local and the intermediate frequency $f_{IF}$ to 3.7 MHz. As described above with reference to FIG. 11, if the local oscillation frequency $f_{LO}$ is set to a value 3.7 MHz lower than the center frequency of the selected channel, the frequency band of the RF signal that becomes a disturbance wave is a frequency band centered on a value 7.4 MHz lower than the desired signal frequency. If channel 6 in the VHF band is selected under this set condition, the RF signal of a channel one or two channels above does not make disturbance. Signals of other channels that are present within the frequency band of the intermediate signal of the selected channel are sufficiently reduced by a filter specific to the selected channel included in the tuning circuit 12.

In step S15, the control circuit 16 sets the local oscillation frequency $f_{LO}$ to lower-local and the intermediate frequency $f_{IF}$ to 3.7 MHz as in step S14. That is, if the local oscillation frequency $f_{LO}$ is set to lower-local and the intermediate frequency $f_{IF}$ is set to 3.7 MHz even when there is a large level RF signal in the channel next higher than the desired selected channel, an effect of reception disturbance can be suppressed as in step S14.

In step S16, the control circuit 16 sets the local oscillation frequency $f_{LO}$ to upper-local and the intermediate frequency $f_{IF}$ to 4 MHz. In this case, the tuner module 1 can use a filter specific to the selected channel included in the tuning circuit 12 to reduce a signal from other channels, that may become a disturbance wave, to a low level under this set condition.

As described above, the tuner module 1 according to the present embodiment adjusts the local oscillation frequency to a value that suppresses an effect of a disturbance wave from other channels within the frequency band of the intermediate frequency signal of the selected channel. That is, the tuner module 1 is arranged so that the control circuit 16 supplies, to the local oscillation circuit 17, the local oscillation frequency $f_{LO}$ that is higher or lower than the frequency of the received RF signal depending on the selected channel. The tuner module 1, in this way, adjusts the local oscillation frequency $f_{LO}$ oscillated by the local oscillation circuit 17 to a value that suppresses an effect of a disturbance wave from other channels within the frequency band of the intermediate frequency signal of the selected channel. This enables the tuner module 1 to suppress an effect of reception disturbance due to RF signals that are present in channels adjacent to the selected channel even when the tuner module 1 adopts the low-IF architecture.

The case where the tuner module 1 receives television broadcasting in Japan is described above, but the tuner module 1 is applicable to areas in the world as described above. In general, the frequencies (reception channel frequencies) assigned to channels of television broadcasting are different for each country or area. As described below, the tuner module 1 is applicable to any areas where the spacing between reception channel frequencies is different by setting the optimum local oscillation frequency $f_{LO}$ for each area where television broadcasting is received.

Specifically, during presetting of a television set, the tuner module 1 receives television broadcast waves, performs the signal scanning of the RF signal of the received television broadcast waves, and obtains reception channel frequency data. Then, the tuner module 1 formats the obtained reception channel frequency data in a tabular form and stores it in the memory 18 in FIG. 4. The tuner module 1 controls the local oscillation frequency $f_{LO}$ with reference to the table.

Figure 15:
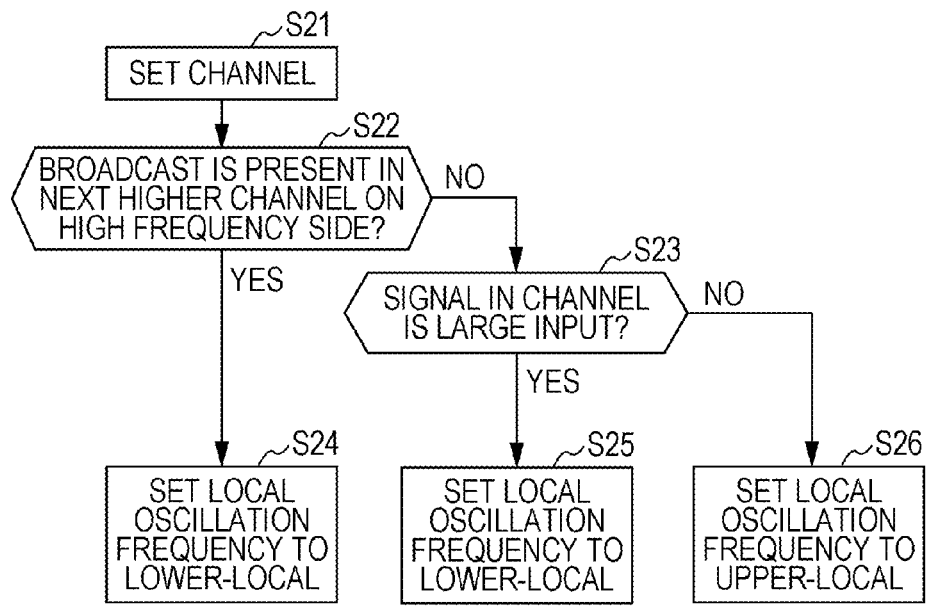
FIG. 15 is a flowchart illustrating an example of setting the local oscillation frequency $f_{LO}$ by the tuner module according to the present embodiment.

FIG. 15 is a flowchart illustrating an example of controlling the local oscillation frequency $f_{LO}$ by the tuner module 1. In the procedure shown in FIG. 15, the same processes as in FIG. 14 are not described in detail. In the procedure shown in FIG. 15, the local oscillation frequency $f_{LO}$ is initialized to upper-local.

In step S21, the tuning circuit 12 included in the tuner module 1 selects a frequency from RF signals. Next, for example, the tuning circuit 12 sets a desired channel as a selected channel with reference to reception channel frequency data stored in the table in the memory 18.

In step S22, the control circuit 16 included in the tuner module 1 determines whether there is broadcasting (a broadcast station) in the channel next higher than this selected channel, which has a frequency higher than the selected channel, with reference to reception channel frequency data stored in the table in the memory 18 obtained during presetting. If the control circuit 16 determines that there is no broadcasting in the next higher channel, the processing proceeds to step S23. If the control circuit 16 determines that there is broadcasting in the next higher channel, the processing proceeds to step S24.

In step S23, the control circuit 16 determines whether the signal in the channel is a large input, that is, whether there is a broadcast wave or a large level signal (such as an RF signal or noise) other than a broadcast wave in the channel next higher than the selected channel. Specifically, in step S23, the control circuit 16 obtains the control data (AGC data) for controlling the high frequency amplification circuit 13 in FIG. 4 (equivalent to the high frequency amplification circuit 442 in FIG. 6). Even if the modulation system of received signal noise is different from that of the tuner module 1, the high frequency amplification circuit 13 can use gain control to detect the noise in response to the noise level. The level of control data of the high frequency amplification circuit 13 is proportional to the level of a reception signal such as a broadcast wave, RF signal, or noise. The control circuit 16 determines whether the level of the obtained control data for the high frequency amplification circuit 13 is equal to or greater than a predetermined threshold. If the control circuit 16 determines that the level of the control data for the high frequency amplification circuit 13 is equal to or greater than the predetermined threshold, the control circuit 16 decides that there is a large level signal in the channel next higher than the selected channel.

When the control circuit 16 decides that there is a broadcast wave or a large level signal other than a broadcast wave in the channel next higher than the selected channel, the processing proceeds to step S25. When the control circuit 16 decides that there is no broadcast wave or no large level signal other than a broadcast wave in the channel next higher than the selected channel, the processing proceeds to step S26.

In step S24, the control circuit 16 sets the local oscillation frequency $f_{LO}$ of the selected channel set in step S21 to lower-local. At this time, the control circuit 16 may set the intermediate frequency $f_{IF}$ to an optimum value. If the local oscillation frequency $f_{LO}$ is set to lower-local, the local oscillation frequency $f_{LO}$ becomes a value the intermediate frequency $f_{IF}$ smaller than the center frequency of the selected channel. The frequency band of an RF signal that becomes a disturbance wave is the frequency band centered on a value sufficiently smaller than the desired signal frequency. Under this set condition, if there is a broadcast wave or a large level signal other than a broadcast wave in the next higher channel, the signal does not make disturbance.

In step S25, the control circuit 16 sets the local oscillation frequency $f_{LO}$ of the selected channel to lower-local.

In step S26, the control circuit 16 sets the local oscillation frequency $f_{LO}$ of the selected channel to upper-local.

As described above, using a selected-channel-specific filter included in the tuning circuit 12, the tuner module 1 can reduce a signal from adjacent channels that may become a disturbance wave to a sufficiently low level by setting the local oscillation frequency $f_{LO}$ of the selected channel to an optimum value. This enables the tuner module 1 to receive, in areas in the world where the television system used or the spacing between reception channel frequencies is different, the broadcast waves of television broadcasting receivable in the areas.

Figure 16:
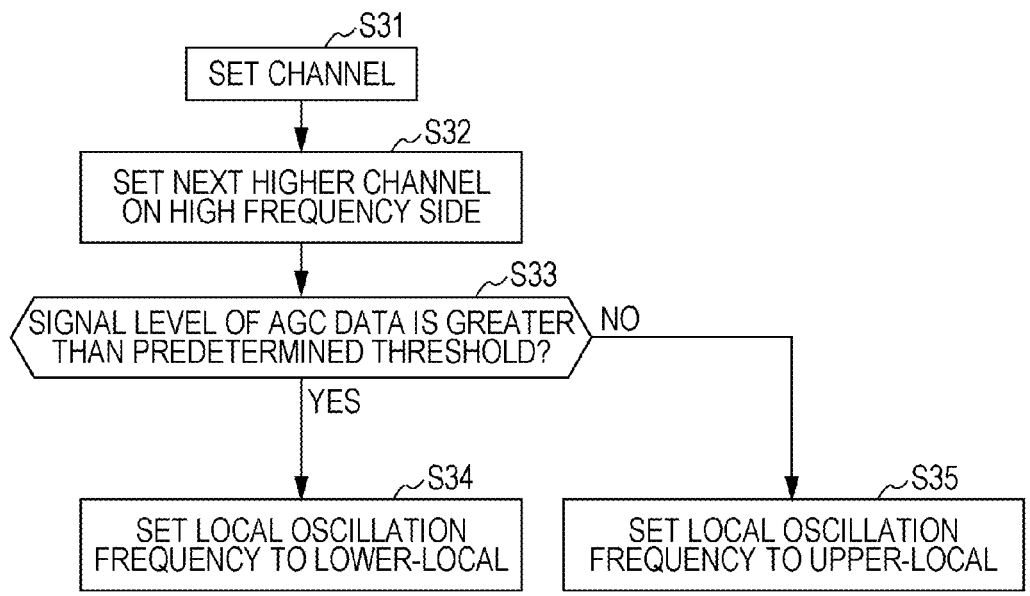
FIG. 16 is a flowchart illustrating an example of setting the local oscillation frequency $f_{LO}$ by the tuner module according to the present embodiment.

The tuner module 1 may also control the local oscillation frequency $f_{LO}$ by following the procedure shown in FIG. 16. In the procedure shown in FIG. 16, the same processes as in FIGS. 14 and 15 are not described in detail. In the procedure shown in FIG. 16, the local oscillation frequency $f_{LO}$ is initialized to upper-local. In the procedure shown in FIG. 16, the tuner module 1 sets the channel next higher than the selected channel and, if a large level signal is present in this channel, sets the local oscillation frequency $f_{LO}$ to lower-local.

That is, in step S31, the tuning circuit 12 included in the tuner module 1 selects a frequency from RF signals of television broadcasting and sets a desired channel as the selected channel.

In step S32, the tuning circuit 12 selects a frequency from RF signals of television broadcasting and sets the channel next higher than the selected channel, which has a frequency higher than the selected channel set in step S31.

In step S33, the control circuit 16 determines whether there is a large level signal such as a broadcast wave, RF signal, or noise in the channel next higher than the selected channel. Specifically, in step S33, the control circuit 16 obtains control data (AGC data) for controlling the high frequency amplification circuit 13. The control circuit 16 determines whether the level of the obtained control data for the high frequency amplification circuit 13 is equal to or greater than a predetermined threshold. If the control circuit 16 determines that the level of the control data for the high frequency amplification circuit 13 is equal to or greater than the predetermined threshold, the control circuit 16 decides that there is a large level signal in the channel next higher than the selected channel.

When the control circuit 16 decides that there is a large level signal other than a broadcast wave in the channel next higher than the selected channel, the processing proceeds to step S34. When the control circuit 16 decides that there is no large level signal other than a broadcast wave in the channel next higher than the selected channel, the processing proceeds to step S35.

In step S34, the control circuit 16 sets the local oscillation frequency $f_{LO}$ of the selected channel set in step S31 to lower-local.

In step S35, the control circuit 16 sets the local oscillation frequency $f_{LO}$ of the selected channel to upper-local.

In this type of control processing of the local oscillation frequency $f_{LO}$ shown in FIG. 16, reception channel frequency data obtained by signal scanning during presetting is not referenced, so this procedure is applicable to a mobile television or other applications whose reception environments continues to vary.

As described above, the tuner module 1 adjusts the local oscillation frequency to a value that suppresses an effect of a disturbance wave from other channels within the frequency band of signal with the intermediate frequency of the selected channel. The tuner module 1 can receive the broadcast wave of a desired selected channel even when a signal causing disturbance is not a broadcast wave. This enables the tuner module 1 to receive, in any area in the world, the broadcast waves of television broadcasting receivable in the area.

It will be clear that the present invention is not limited to the embodiment described above and various modifications may be made without departing from the scope of the invention.

In the embodiment described above, the reception of terrestrial analog television broadcasting by the tuner module 1 is described, but the tuner module 1 can also receive terrestrial digital television broadcasting. As in the embodiment described above, an optimum local oscillation frequency $f_{LO}$ can be set for each of certain channels having a small inter-channel spacing in the UHF band (channels 13 to 62) assigned to terrestrial digital television broadcasting.

In the embodiment described above, the tuner module 1 initializes the local oscillation frequency $f_{LO}$ to upper-local, but the tuner module 1 may initialize the local oscillation frequency $f_{LO}$ to lower-local. In this case, substantially the same procedures as illustrated in FIGS. 14 to 16 are performed. Accordingly, the same processes as in FIGS. 14 to 16 are not described in detail.

For example, when the tuner module 1 initializes the local oscillation frequency $f_{LO}$ to lower-local in the same procedures as in FIGS. 15 and 16, the control circuit 16 determines whether there is a large level signal in the channel next lower than the selected channel after setting the selected channel, which has a frequency lower than the selected channel. If the control circuit 16 determines that there is a large level signal in the next lower channel, the control circuit 16 sets the local oscillation frequency $f_{LO}$ to upper-local. If the control circuit 16 determines that there is no large level signal in the next lower channel, the control circuit 16 sets the local oscillation frequency $f_{LO}$ to lower-local.

The present application contains subject matter related to that disclosed in Japanese Priority Patent Applications JP 2008-303000 filed in the Japan Patent Office on Nov. 27, 2008 and JP 2009-213485 filed in the Japan Patent Office on Sep. 15, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A tuner module comprising:
    a filter to reduce a signal level outside a frequency band of a selected channel in an input radio frequency signal of terrestrial television broadcasting;
    a local oscillation circuit to oscillate a local oscillation signal;
    a mixing circuit to mix the radio frequency signal in which the signal level outside the frequency band of the selected channel is reduced by the filter and the local oscillation signal oscillated by the local oscillation circuit to downconvert the radio frequency signal to an intermediate frequency signal;
    a control circuit to control a local oscillation frequency of the local oscillation signal oscillated by the local oscillation circuit;
    wherein the control circuit adjusts the local oscillation frequency to a value that suppresses an effect of a disturbance wave from other channels within a frequency band of the intermediate frequency signal of the selected channel;
    a memory to store frequency information of the input radio frequency signal of terrestrial television broadcasting; and
    a tuning circuit,
    wherein, when the tuning circuit sets the selected channel when the local oscillation frequency is initialized to a value higher than a center frequency of the selected channel, the control circuit adjusts the local oscillation frequency to a value lower than the center frequency of the selected channel when the control circuit determines that there is broadcasting in a channel next higher than the selected channel with reference to the frequency information, the channel next higher than the selected channel having a frequency higher than the channel frequency of the selected channel.

2. The tuner module of claim 1, further comprising a memory to store a setting of the local oscillation frequency, the setting including a value for suppressing an effect of reception disturbance within the frequency band of the selected channel, for each channel of terrestrial television broadcasting, wherein the control circuit reads the setting stored in the memory and supplies the setting to the local oscillation circuit.

3. The tuner module of claim 2, wherein the local oscillation frequency is set and stored in the memory when the tuner module is preset.

4. The tuner module of claim 1, wherein the control circuit adjusts the local oscillation frequency to a value close to a center frequency of the selected channel.

5. The tuner module of claim 1, wherein the control circuit adjusts the local oscillation frequency to frequency having a difference with a center frequency of the selected channel equal to the intermediate frequency, the frequency being higher or lower than the center frequency depending on the selected channel.

6. The tuner module of claim 5, wherein the local oscillation frequency is 3.7 MHz lower than the center frequency of the selected channel when the selected channel is channel 6 or 7 a the very high frequency (VHF) band of terrestrial analog television broadcasting.

7. The tuner module of claim 5, wherein the local oscillation frequency is 4 MHz higher than the center frequency of the selected channel when the selected channel is any one of channels 1 to 5 and 8 to 12 in a very high frequency (VHF) band of terrestrial analog television broadcasting.

8. The tuner module comprising:
    a tuning circuit;
    a high frequency amplification circuit,
    wherein:
    the tuning circuit sets the selected channel when the local oscillation frequency is initialized to a value higher than a center frequency of the selected channel and then sets a channel next higher than the selected channel, the channel next higher than the selected channel having a frequency higher than a channel frequency of the selected channel;
    the control circuit determines whether control data is equal to or greater than a predetermined threshold, the control data being used to control the high frequency amplification circuit depending on a level of a radio frequency signal in the channel next higher than the selected channel, and, when the control data is equal to or greater than the predetermined threshold, the control circuit adjusts the local oscillation frequency to a value lower than the center frequency of the selected channel;
    a filter to reduce a signal level outside a frequency band of a selected channel in an input radio frequency signal of terrestrial television broadcasting;
    a local oscillation circuit to oscillate a local oscillation signal;
    a mixing circuit to mix the radio frequency signal in which the signal level outside the frequency band of the selected channel is reduced by the filter and the local oscillation signal oscillated by the local oscillation circuit to downconvert the radio frequency signal to an intermediate frequency signal;
    a control circuit to control a local oscillation frequency of the local oscillation signal oscillated by the local oscillation circuit;
    wherein the control circuit adjusts the local oscillation frequency to a value that suppresses an effect of a disturbance wave from other channels within a frequency band of the intermediate frequency signal of the selected channel;
    a memory to store frequency information of the input radio frequency signal of terrestrial television broadcasting; and
    a tuning circuit,
    wherein, when the tuning circuit sets the selected channel when the local oscillation frequency is initialized to a value higher than a center frequency of the selected channel, the control circuit adjusts the local oscillation frequency to a value lower than the center frequency of the selected channel when the control circuit determines that there is broadcasting in a channel next higher than the selected channel with reference to the frequency information, the channel next higher than the selected channel having a frequency higher than the channel frequency of the selected channel.

9. The tuner module comprising:
    a memory to store frequency information of the input radio frequency signal of terrestrial television broadcasting;
    a tuning circuit,
    wherein, when the tuning circuit sets the selected channel when the local oscillation frequency is initialized to a value lower than a center frequency of the selected channel, the control circuit adjusts the local oscillation frequency to a value higher than the center frequency of the selected channel when the control circuit determines that there is broadcasting in a channel next lower than the selected channel with reference to the frequency information, the channel next lower than the selected channel having a frequency lower than the channel frequency of the selected channel;
a filter to reduce a signal level outside a frequency band of a selected channel in an input radio frequency signal of terrestrial television broadcasting;
a local oscillation circuit to oscillate a local oscillation signal;
a mixing circuit to mix the radio frequency signal in which the signal level outside the frequency band of the selected channel is reduced by the filter and the local oscillation signal oscillated by the local oscillation circuit to downconvert the radio frequency signal to an intermediate frequency signal;
a control circuit to control a local oscillation frequency of the local oscillation signal oscillated by the local oscillation circuit;
wherein the control circuit adjusts the local oscillation frequency to a value that suppresses an effect of a disturbance wave from other channels within a frequency band of the intermediate frequency signal of the selected channel;
a memory to store frequency information of the input radio frequency signal of terrestrial television broadcasting; and
a tuning circuit,
wherein, when the tuning circuit sets the selected channel when the local oscillation frequency is initialized to a value higher than a center frequency of the selected channel, the control circuit adjusts the local oscillation frequency to a value lower than the center frequency of the selected channel when the control circuit determines that there is broadcasting in a channel next higher than the selected channel with reference to the frequency information, the channel next higher than the selected channel having a frequency higher than the channel frequency of the selected channel.

10. The tuner module comprising:
a tuning circuit;
a high frequency amplification circuit,
wherein:
the tuning circuit sets the selected channel when the local oscillation frequency is initialized to a value lower than a center frequency of the selected channel and then sets a channel next lower than the selected channel, the channel next lower than the selected channel having a frequency lower than the channel frequency of the selected channel;
the control circuit determines whether control data is equal to or greater than a predetermined threshold, the control data being used to control the high frequency amplification circuit depending on a level of a radio frequency signal in the channel next lower than the selected channel, and, when the control data is equal to or greater than the predetermined threshold, the control circuit adjusts the local oscillation frequency to a value higher than the center frequency of the selected channel;
a filter to reduce a signal level outside a frequency band of a selected channel in an input radio frequency signal of terrestrial television broadcasting;
a local oscillation circuit to oscillate a local oscillation signal;
a mixing circuit to mix the radio frequency signal in which the signal level outside the frequency band of the selected channel is reduced by the filter and the local oscillation signal oscillated by the local oscillation circuit to downconvert the radio frequency signal to an intermediate frequency signal;
a control circuit to control a local oscillation frequency of the local oscillation signal oscillated by the local oscillation circuit;
wherein the control circuit adjusts the local oscillation frequency to a value that suppresses an effect of a disturbance wave from other channels within a frequency band of the intermediate frequency signal of the selected channel;
a memory to store frequency information of the input radio frequency signal of terrestrial television broadcasting; and
a tuning circuit,
wherein, when the tuning circuit sets the selected channel when the local oscillation frequency is initialized to a value higher than a center frequency of the selected channel, the control circuit adjusts the local oscillation frequency to a value lower than the center frequency of the selected channel when the control circuit determines that there is broadcasting in a channel next higher than the selected channel with reference to the frequency information, the channel next higher than the selected channel having a frequency higher than the channel frequency of the selected channel.

\* \* \* \* \*